(12) United States Patent
Yun et al.

(10) Patent No.: US 12,142,028 B2
(45) Date of Patent: Nov. 12, 2024

(54) OBJECT RECOGNITION APPARATUS AND METHOD BASED ON ENVIRONMENT MATCHING

(71) Applicant: Electronics and Telecommunications Research Institute, Daejeon (KR)

(72) Inventors: Ki-Min Yun, Daejeon (KR); Jin-Young Moon, Daejeon (KR); Jong-Won Choi, Seoul (KR); Joung-Su Youn, Seoul (KR); Seok-Jun Choi, Seoul (KR); Woo-Seok Hyung, Seoul (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 355 days.

(21) Appl. No.: 17/550,825

(22) Filed: Dec. 14, 2021

(65) Prior Publication Data

US 2023/0015295 A1 Jan. 19, 2023

(30) Foreign Application Priority Data

Jul. 14, 2021 (KR) .......................... 10-2021-0092526

(51) Int. Cl.
*G06V 10/764* (2022.01)
*G06V 10/762* (2022.01)
*G06V 20/40* (2022.01)

(52) U.S. Cl.
CPC .......... *G06V 10/764* (2022.01); *G06V 10/762* (2022.01); *G06V 20/46* (2022.01); *G06V 20/49* (2022.01)

(58) Field of Classification Search
CPC .... G06V 10/764; G06V 10/762; G06V 20/49; G06V 20/46
See application file for complete search history.

(56) References Cited

U.S. PATENT DOCUMENTS 5,995,095 A 11/1999 Ratakonda
10,733,457 B1 * 8/2020 Agnihotram ..... G08B 13/19613
(Continued)

FOREIGN PATENT DOCUMENTS

EP 3 819 828 A1 5/2021
KR 102029852 B1 10/2019
(Continued)

OTHER PUBLICATIONS

Xiaomin Pei, et al., "An Unsupervised Feature learning and clustering method for key frame extraction on human action recognition", The 7th Annual IEEE International Conference on Cyber Technology in Automation, Control and Intelligent Systems, Jul. 31-Aug. 4, 2017, Hawaii, USA, pp. 759-762 (4 pages total).

*Primary Examiner* — Utpal D Shah
(74) *Attorney, Agent, or Firm* — Sughrue Mion, PLLC (57) ABSTRACT

Disclosed herein are an object recognition apparatus and method based on environment matching. The object recognition apparatus includes memory for storing at least one program, and a processor for executing the program, wherein the program performs extracting at least one key frame from a video that is input in real time, determining a similarity between the key frame extracted from the input video and each of videos used as training data of prestored multiple recognition models, based on a pretrained similarity-matching network, and selecting a recognition model pretrained with a video having a maximal similarity to the key frame extracted from the input video, preprocessing the input video such that at least one of color and size of a video used as training data of an initial model is similar to that of the input video, and recognizing the preprocessed video based on the initial model.

17 Claims, 7 Drawing Sheets

(56) References Cited

U.S. PATENT DOCUMENTS

| | | | |
|---|---|---|---|
| 10,902,276 B2 | 1/2021 | Kim et al. | |
| 2016/0012296 A1 | 1/2016 | Xing et al. | |
| 2019/0251612 A1* | 8/2019 | Fang | G06Q 30/0643 |
| 2020/0387755 A1* | 12/2020 | Hagen | G06V 10/7747 |
| 2020/0394451 A1* | 12/2020 | Baijal | G06F 18/285 |
| 2021/0125639 A1* | 4/2021 | Cai | G06V 40/10 |
| 2021/0142149 A1* | 5/2021 | Skans | G06V 40/107 |
| 2022/0004812 A1* | 1/2022 | Li | G06N 3/045 |

FOREIGN PATENT DOCUMENTS

| | | |
|---|---|---|
| KR | 10-2135479 B1 | 7/2020 |
| KR | 1020200142374 A | 12/2020 |
| WO | 2012118259 A1 | 9/2012 |

* cited by examiner

OBJECT RECOGNITION APPARATUS AND METHOD BASED ON ENVIRONMENT MATCHING

CROSS REFERENCE TO RELATED APPLICATION

This application claims the benefit of Korean Patent Application No. 10-2021-0092526, filed Jul. 14, 2021, which is hereby incorporated by reference in its entirety into this application.

BACKGROUND OF THE INVENTION

1. Technical Field

The following embodiments relate to deep-learning-based object recognition technology, which is adapted online to each scene through environment matching.

2. Description of the Related Art

The greatest obstacle to application of existing most deep-learning-based artificial intelligence technologies to actual situations is to require expensive Graphics Processing Unit (GPU) equipment.

Especially in computer vision fields, the number of cameras to be processed is large, and the number of images to be processed per camera is exponentially increased when it is required to process a video. Due thereto, in order to apply a deep-learning algorithm to actual fields, a large number of pieces of GPU equipment, thus increasing expenses required to apply a deep-learning algorithm to fields. No matter how a deep-learning algorithm provides high performance, such an obstacle is the cause of deteriorating accessibility to the deep-learning algorithm by actual users.

Therefore, a deep-learning algorithm is designed to minimize the use of GPU memory used and a computational load in a design stage, and labeling is optimized using previously given training data is performed in a learning stage, after which the deep-learning-learning algorithm is installed in the field and used in an inference stage. However, this is based on the assumption that an image that is an inference target of the deep-learning algorithm is similar to an image previously used to train the deep-learning algorithm. Therefore, there is a difficulty in that, when the scene or visual feature of an image input to the deep-learning algorithm installed in the field is completely different from that of the training image, training of the deep-learning algorithm must be newly performed. That is, a problem arises in that the previously trained deep-learning network is specialized for scenes corresponding to an image used for training, and thus expected performance cannot be exhibited when applied to various scenes.

Therefore, in order to solve this problem, there is a tendency that a lot of research into a domain adaptation scheme has been conducted. However, this domain adaptation scheme is to define a source domain utilized for current learning and a target domain that is data acquired from a current scene and to allow the source domain to approach the right answer, and thus such a domain adaptation scheme is an approach for converting an image like the current target domain in relation to the source domain. However, since source domain data and target domain data are simultaneously learned during a learning process, an inefficient process for collecting data from the target domain and relearning the collected target data is required.

That is, conventional object recognition technology based on a deep-learning-based convolution network is problematic in that relearning must be conducted each time through previously labeled data for each environment.

SUMMARY OF THE INVENTION

An embodiment is intended to provide technology which allows a deep-learning network, which recognizes an object from an image, to be automatically optimized and used for the corresponding scene without deteriorating performance even if a current scene is changed from the scene of training data that is previously learned.

An embodiment is intended to provide technology in which a deep-learning network for recognizing an object from an image does not need to relearn each image input to the deep-learning network each time through labeled data for each environment in which the image is captured.

In accordance with an aspect, there is provided an object recognition apparatus based on environment matching, including memory for storing at least one program, and a processor for executing the program, wherein the program performs acquiring a recognition model pretrained based on a video captured in an environment similar to an environment to which a video that is input in real time belongs, and recognizing an object in a scene of the video that is input in real time using the acquired recognition model as an initial model.

The object recognition apparatus may further include a recognition model database for storing multiple recognition models, pretrained to recognize an object using respective videos captured in different environments as pieces of training data, in a compressed format, wherein acquiring the pretrained recognition model includes selecting one of the multiple recognition models that are prestored based on environment matching.

Acquiring the pretrained recognition model may further include extracting at least one key frame from the video that is input in real time, and selecting the initial model from the recognition model database based on the key frame.

Extracting the at least one key frame may include extracting features from respective image frames of the video that is input in real time based on a pretrained adversarial autoencoder, and extracting the at least one key frame by repeatedly executing a K-means clustering algorithm based on the extracted features.

The adversarial autoencoder may include an autoencoder including an encoder for executing a feature from a first image and a decoder for reconstructing a second image from the feature extracted by the encoder, the autoencoder being pretrained to cause the first image and the second image to be similar to each other, and a discriminator pretrained to discriminate the first image from the second image, wherein extracting the features includes outputting the feature extracted by the encoder for the video that is input in real time.

Selecting the initial model may include determining a similarity between the key frame extracted from the video that is input in real time and each of videos used as training data of the multiple recognition models stored in the recognition model database, based on a pretrained similarity-matching network, and selecting a recognition model pretrained with a video having a maximum similarity to the key frame extracted from the video that is input in real time.

Selecting the initial model may further include converting the key frame extracted from the video that is input in real time into high-dimensional information through semantic segmentation, and the key frame converted into the high-dimensional information may be input to the pretrained similarity-matching network.

The similarity-matching network may be configured based on a Siamese network based on a triplet loss, and is trained such that a feature distance to a positive sample belonging to a category identical to a category of an anchor sample is minimized and a feature distance to a negative sample belonging to a category different from the category of the anchor sample is maximized.

Recognizing the object may include preprocessing the video that is input in real time such that at least one of a color and a size of a video used as training data of the initial model is similar to at least one of a color and a size of the input video, and recognizing the preprocessed video based on the initial model.

Preprocessing the video may include converting the video that is input in real time such that an average color distribution histogram of the input video is similar to an average color distribution histogram of the video used as the training data of the initial model that is prestored.

Preprocessing the video may further include converting the size of the video that is input in real time to at least two different sizes, after videos having different sizes are individually input to the initial model, determining a size of a video having a minimum entropy in an output result value, and changing the size of the video that is input in real time to the determined size.

In accordance with another aspect, there is provided an object recognition method based on environment matching, including acquiring a recognition model pretrained based on a video captured in an environment similar to an environment to which a video that is input in real time belongs, and recognizing an object in a scene of the video that is input in real time using the acquired recognition model as an initial model.

Acquiring the pretrained recognition model may further include selecting one of multiple recognition models predefined to recognize an object using each of videos captured in different environments as training data, based on environment matching.

Acquiring the pretrained recognition model may further include extracting at least one key frame from the video that is input in real time, and selecting the initial model from the recognition model database based on the key frame.

Extracting the at least key frame may include extracting features from respective image frames of the video that is input in real time based on a pretrained adversarial autoencoder, and extracting the at least one key frame by repeatedly executing a K-means clustering algorithm based on the extracted features.

Selecting the initial model may further include converting the key frame extracted from the video that is input in real time into high-dimensional information through semantic segmentation, determining a similarity between the key frame, converted into high-dimensional information, and each of videos used as training data of multiple recognition models stored in a recognition model database, based on a pretrained similarity-matching network, and selecting a recognition model pretrained with a video having a maximum similarity to the key frame extracted from the video that is input in real time.

Recognizing the object may include preprocessing the video that is input in real time such that at least one of a color and a size of a video used as training data of the initial model is similar to at least one of a color and a size of the input video, and recognizing the preprocessed video based on the initial model.

Preprocessing the video may include converting the video that is input in real time such that an average color distribution histogram of the input video is similar to an average color distribution histogram of the video used as the training data of the initial model that is prestored.

Preprocessing the video may include converting the size of the video that is input in real time to at least two different sizes, after videos having different sizes are individually input to the initial model, determining a size of a video having a minimum entropy in an output result value, and changing the size of the video that is input in real time to the determined size.

In accordance with a further aspect, there is provided an object recognition apparatus based on environment matching, including memory for storing at least one program, and a processor for executing the program, wherein the program performs extracting at least one key frame from a video that is input in real time, determining a similarity between the key frame extracted from the video that is input in real time and each of videos used as training data of prestored multiple recognition models, based on a pretrained similarity-matching network, selecting a recognition model pretrained with a video having a maximal similarity to the key frame extracted from the video that is input in real time, preprocessing the video that is input in real time such that at least one of a color and a size of a video used as training data of an initial model is similar to at least one of a color and a size of the input video, and recognizing the preprocessed video based on the initial model.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Advantages and features of the present invention and methods for achieving the same will be clarified with reference to embodiments described later in detail together with the accompanying drawings. However, the present invention is capable of being implemented in various forms, and is not limited to the embodiments described later, and these embodiments are provided so that this invention will be thorough and complete and will fully convey the scope of the present invention to those skilled in the art. The present invention should be defined by the scope of the accompanying claims. The same reference numerals are used to designate the same components throughout the specification.

It will be understood that, although the terms "first" and "second" may be used herein to describe various components, these components are not limited by these terms. These terms are only used to distinguish one component from another component. Therefore, it will be apparent that a first component, which will be described below, may alternatively be a second component without departing from the technical spirit of the present invention.

The terms used in the present specification are merely used to describe embodiments, and are not intended to limit the present invention. In the present specification, a singular expression includes the plural sense unless a description to the contrary is specifically made in context. It should be understood that the term "comprises" or "comprising" used in the specification implies that a described component or step is not intended to exclude the possibility that one or more other components or steps will be present or added.

Unless differently defined, all terms used in the present specification can be construed as having the same meanings as terms generally understood by those skilled in the art to which the present invention pertains. Further, terms defined in generally used dictionaries are not to be interpreted as having ideal or excessively formal meanings unless they are definitely defined in the present specification.

An object recognition apparatus and method based on environment matching according to the present invention are designed to accomplish the following objects.

First, a network structure optimized for a scene a camera is facing must be able to be found in an online situation. This is the same meaning as the fact that a certain scene to which the current network is to be applied during learning is not known, and it means that label data cannot be given to a scene for which a camera is newly installed. Existing network pruning and network quantization, an optimal network may be searched for only in the state in which existing data is defined. That is, a network optimized for previously labeled data is searched for.

In contrast, in an embodiment, when input in a new scene is continuously provided without label data, an approach for searching for the network optimized for the continuous input is utilized.

Also, in a network adapted to a scene online, the process for additionally reviewing and training data previously utilized for learning cannot be added. In laboratory and development rooms in which a visual feature understanding network is trained, a high-performance deep-learning server is utilized, but, in an environment in which the trained network is tested, a high-performance deep-learning server machine cannot be utilized. For that reason, when a network optimized for a scene for which a camera is installed is again searched for, an image or image data obtained from the corresponding scene is taken to the laboratory or the development room, an optimization algorithm is executed, and thereafter a suitable structure must be searched for. This scheme is very insufficient and consequently causes a problem of greatly increasing algorithm application expenses.

In order to solve this problem, the present invention must include an algorithm for searching for and utilizing an optimal network structure without requiring an additional learning process, just by driving a newly developed network online in a specific scene. In an environment which is actually driven by means of such an algorithm, an expensive deep-learning server does not need to be constructed, and the algorithm can be sufficiently applied even to a Graphics Processing Unit (GPU) environment having a small scale required for testing.

Finally, there must be applicability to various scenes. Since domain adaptation technology into which research has been conducted in existing academia can be applied only when label information of training data and information about a current scene must be known in advance, generality thereof is greatly deteriorated.

Therefore, the present invention takes a method for automatically changing input for various scenes and environments and adapting the network to the scenes by utilizing a self-adaptation mechanism. In order to further maximize efficiency, an algorithm for searching for an offline environment most similar to the environment which belongs to the current scene is additionally developed in addition to a self-adaptation mechanism, and thus the algorithm is progressed such that a network optimized for a specific offline environment containing existing similar scene information is utilized as an initial start network.

Hereinafter, an object recognition apparatus and method based on environment matching according to embodiments so as to accomplish the above-described objects will be described in detail with reference to FIGS. 1 to 11.

Figure 1:
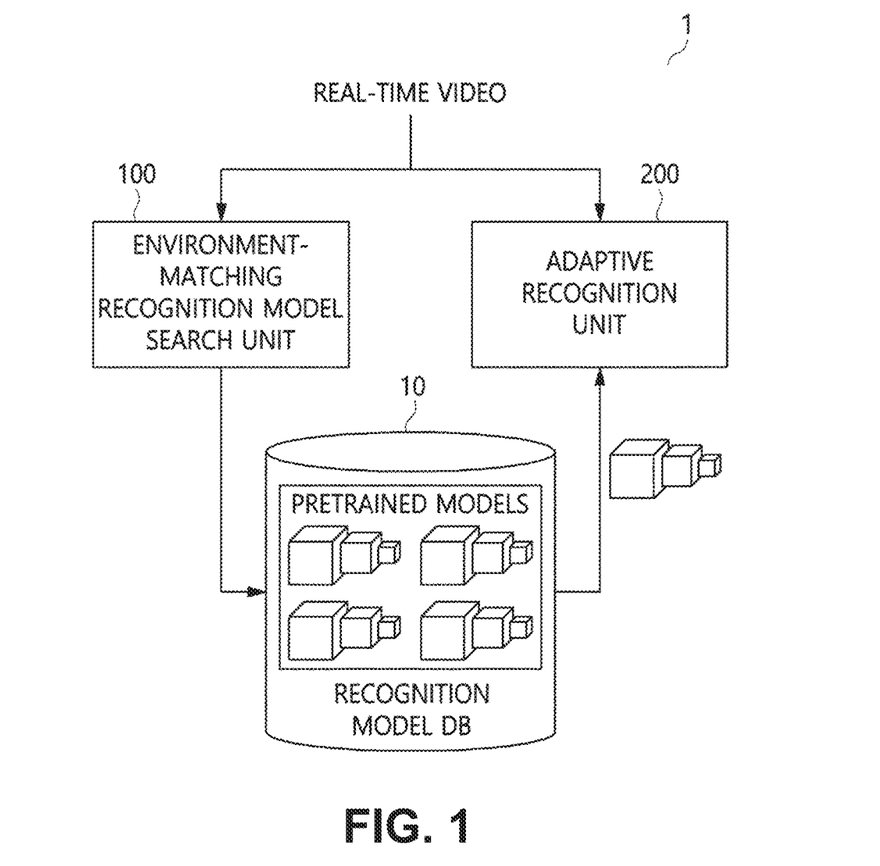
FIG. 1 is a schematic configuration diagram of an object recognition apparatus based on environment matching according to an embodiment.

FIG. 1 is a schematic block diagram of an object recognition apparatus based on environment matching according to an embodiment.

Referring to FIG. 1, the object recognition apparatus based on environment matching according to the embodiment may basically include an environment matching recognition model search unit 100 and an adaptive recognition unit 200.

The environment matching recognition model search unit 100 may acquire a recognition model pretrained based on a video captured in an environment similar to an environment to which a scene of a video that is input in real time belongs.

Here, when the scene is a place where a camera is installed and presumes that one camera faces one scene, the environment may be defined as a set of similar scenes. For example, the environment may be a road environment, an indoor environment or the like, and may be defined as a concept higher than that of the scene.

That is, the environment matching recognition model search unit 100 must be able to search for a recognition model, which is a visual feature network structure optimized to recognize an object based on visual features of a scene that is the target captured by the camera, in an online situation.

Here, the object recognition apparatus based on environment matching according to the embodiment may further include a recognition model database (DB) 10 in which multiple recognition models pretrained using respective videos captured in different environments as pieces of training data are stored in a compressed format.

Here, all of the stored recognition models are already compressed optimally for a specific environment. Further, when one of the recognition models is selected and utilized, high performance may be secured in the specific environment by using a smaller amount of memory used than that of a network which learns the overall environment.

Therefore, the environment matching recognition model search unit 100 may select one of the multiple recognition models prestored in the recognition model DB based on environment matching.

By means of this, the recognition model most suitable for the current online environment is selected from among the recognition models respectively trained in various multiple offline environments models and is then utilized as an initial model of an adaptive network that is driven.

The detailed configuration and operation of the environment matching recognition model search unit 100 will be described later with reference to FIGS. 2 to 8.

The adaptive recognition unit 200 may recognize an object in a scene of a video that is input in real time by utilizing the recognition model acquired by the environment matching recognition model search unit 100 as the initial model.

That is, the adaptive recognition unit 200 recognizes a new scene without requiring label information and an additional learning process, and this recognition is progressed in an actual application environment, thus making it impossible to progress additional learning. However, it is possible to process a change in the input image to a form similar to a learning image used to train the currently selected initial model.

Therefore, the adaptive recognition unit 200 according to the embodiment performs preprocessing of changing the input image to a form similar to the learning image used to train the initial model before an image that is input in real time is input to the initial model. Thereby, the recognition model may be adapted to the current scene, and thus recognition performance may be improved.

The detailed configuration and operation of the adaptive recognition unit 200 will be described later with reference to FIG. 9.

Figure 2:
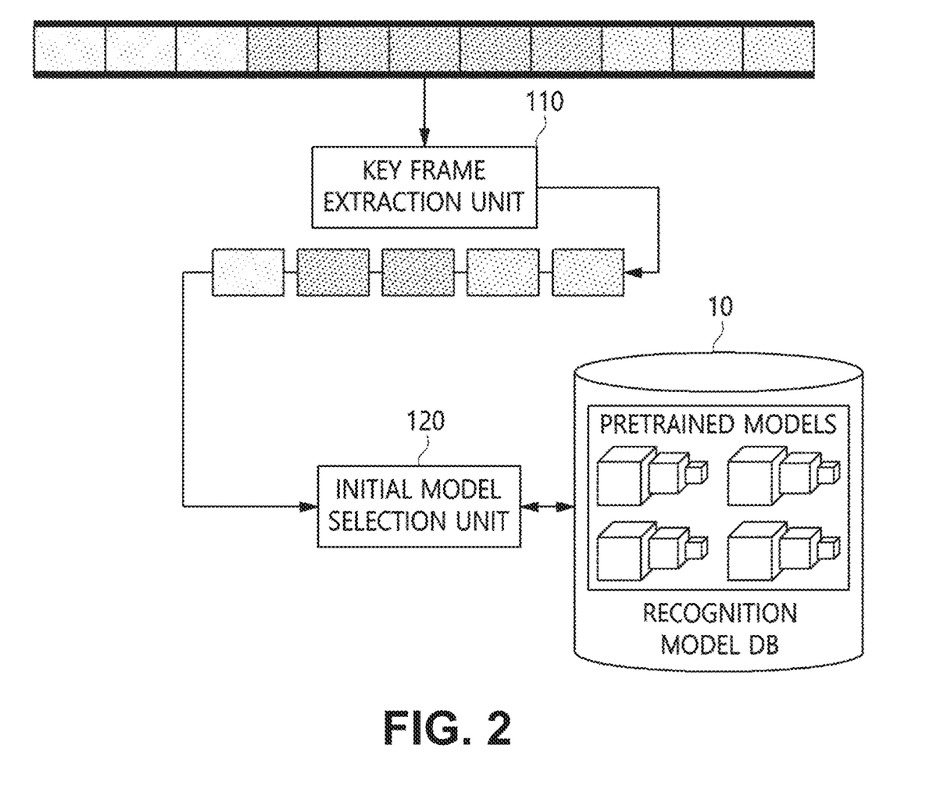
FIG. 2 is an internal configuration diagram of the environment-matching recognition model search unit illustrated in FIG. 1.

FIG. 2 is an internal configuration diagram of the environment matching recognition model search unit 100 illustrated in FIG. 1.

Referring to FIG. 2, the environment matching recognition model search unit 100 may include a key frame extraction unit 110 and an initial model selection unit 120.

The key frame extraction unit 110 may extract at least one key frame from a video that is input in real time.

This is intended to the solve the problem in which, in the case of a video, videos have different lengths and the large number of image frames included in the captured video, especially for an video captured for a long period, and thus the size of a network becomes bloated and a driving speed becomes lower when all of the videos are utilized.

Therefore, the key frame extraction unit 110 extracts a key frame so that only important frames are utilized without all image frames in each video being utilized.

Figure 3:
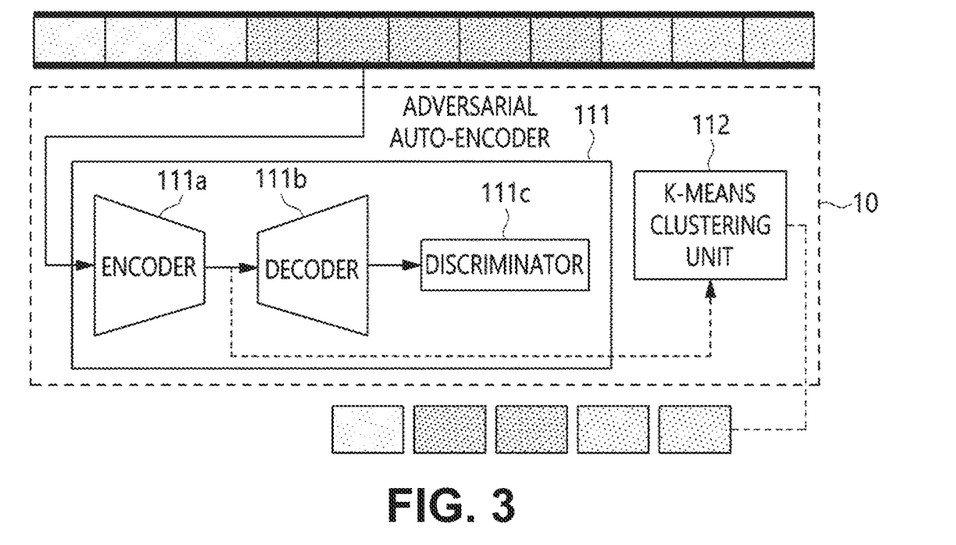
FIG. 3 is an internal configuration diagram of the key frame extraction unit illustrated in FIG. 2.
Figure 4:
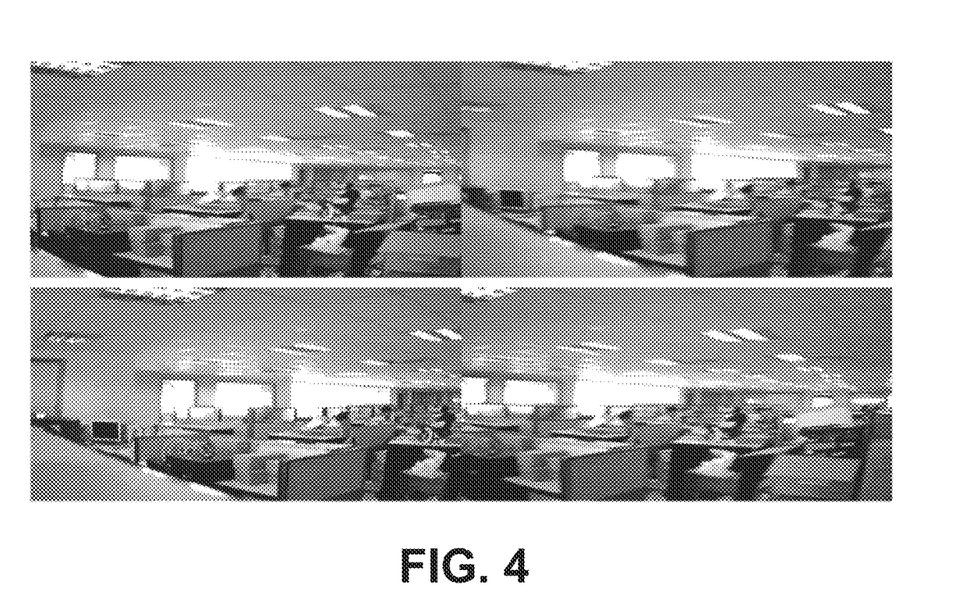
FIG. 4 is a diagram illustrating examples of a key frame extracted by the key frame extraction unit.

FIG. 3 is an internal configuration diagram of the key frame extraction unit 110 illustrated in FIG. 2, and FIG. 4 is a diagram illustrating examples of a key frame extracted by the key frame extraction unit 110.

Referring to FIG. 3, the key frame extraction unit 110 extracts features from respective image frames of an input video using the encoder of a pretrained Adversarial Autoencoder (AAE) 111. Thereafter, a K-means clustering unit 112 extracts at least one key frame based on the extracted features.

Here, the adversarial autoencoder 111 includes an autoencoder 111a/111b and a discriminator 111c.

The autoencoder 111a/111b includes an encoder 111a for extracting features from a first image and a decoder 111b for reconstructing a second image from the features extracted by the encoder 111a, and is repeatedly trained to cause the first image and the second image to be similar to each other.

However, when only an autoencoder is configured, a problem may arise in that an average image learned by aggregating all images is output, and thus the adversarial autoencoder in which the discriminator (or a discriminator network) 111c is added to a basic autoencoder is used so as to solve such a problem.

The discriminator 111c is pretrained to discriminate the first image from the second image.

That is, the autoencoder 111a/111b and the discriminator 111c are trained in opposite directions.

As described above, because the discriminator 111c is trained to desirably discriminate the first image from the second image, the discrimination performance thereof may be further improved as the quality of an image output from the autoencoder is deteriorated.

In contrast, the autoencoder 111a/111b is trained to output a high-quality image that cannot be desirably discriminated by the discriminator 111c. Therefore, the autoencoder 111a/111b is trained such that the first image and the second image are as similar to each other as possible.

In this way, as the autoencoder 111a/111b and the discriminator 111c are competitively trained, the autoencoder 111a/111b outputs a higher-quality image, and the discriminator 111c is trained to discriminate the image even in the case of the higher-quality image.

As long as only the encoder 111a of the autoencoder 111a/111b trained as described above is present, information may be obtained by compressing an input image and converting the compressed image into features.

The key frame extraction unit 110 may extract K key frames by executing a K means clustering algorithm on a video input in real time based on the features extracted by the encoder 111a.

Here, the algorithm is executed such that the value of K in the K-means clustering algorithm is twice the number of key frames desired to be extracted by the key frame extraction unit 110. After a number of clusters corresponding to twice the number of key frames are acquired through the K-means clustering algorithm, K clusters having a smaller size are deleted from the acquired clusters. Thus, all of the above-described small clusters are deleted, and only clusters having relatively large samples remain. A K-means clustering algorithm is newly executed using the centroid of the remaining clusters as a start point. By means of these processes, the previously deleted small clusters may naturally belong to the K remaining clusters.

Through the foregoing operations, the key frame extraction unit 110 may automatically extract major scenes, such as a scene for which a camera is moving in a video, or a changing scene in the video, as shown in FIG. 4.

Referring back to FIG. 2, the initial model selection unit 120 selects an initial model from the recognition model DB 10 based on the extracted key frames.

Figure 5:
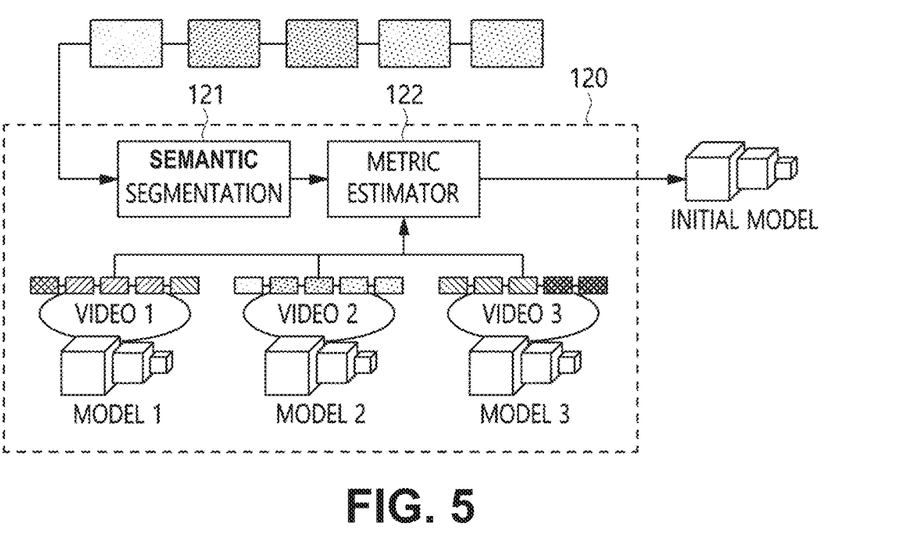
FIG. 5 is an internal configuration diagram of the initial model selection unit illustrated in FIG. 2.
Figure 6:
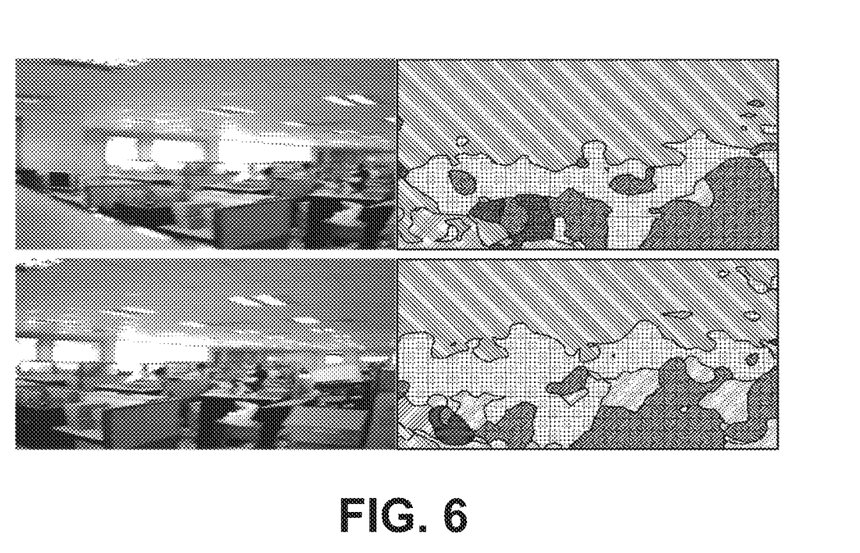
FIG. 6 is a diagram illustrating an example in which a key frame is converted through semantic segmentation according to an embodiment.
Figure 7:
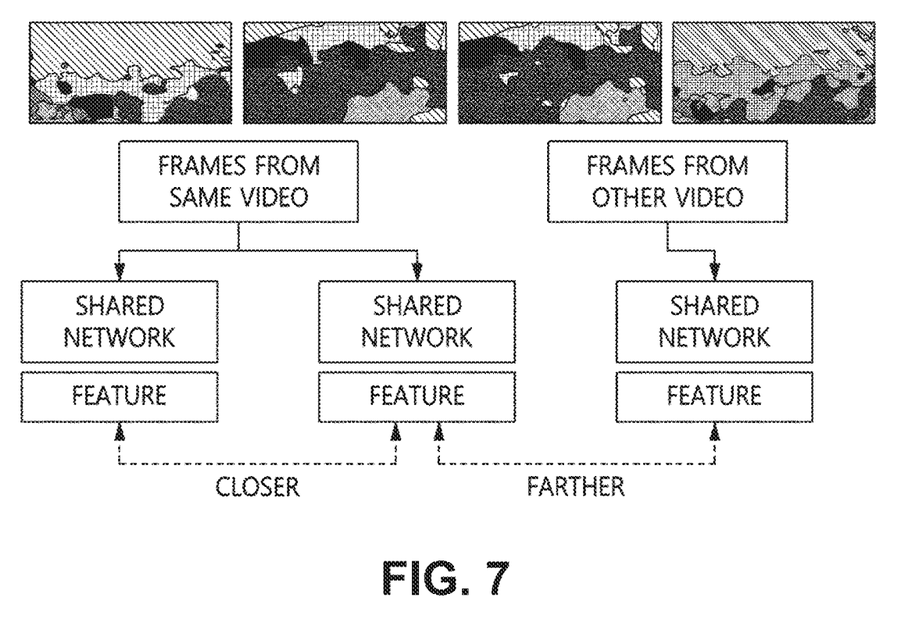
FIG. 7 is a diagram illustrating an example of learning of a video matching network based on self-supervised learning according to an embodiment.
Figure 8:
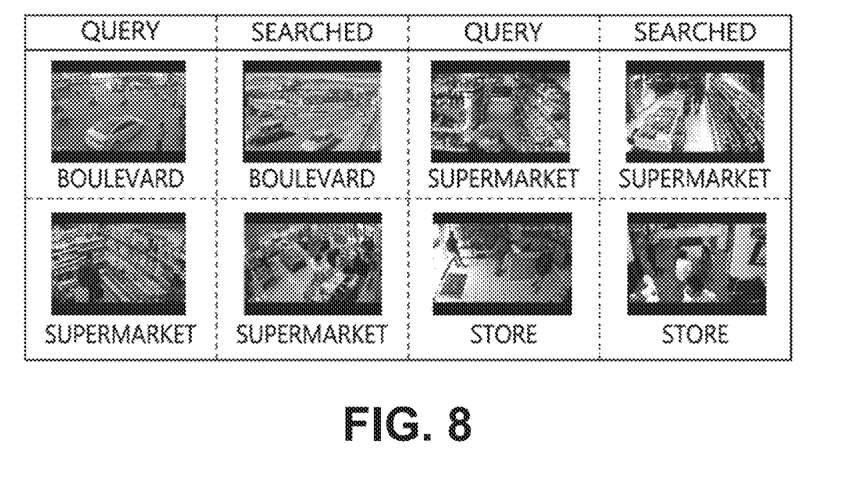
FIG. 8 is a diagram illustrating examples of the results of searching for a video based on environment matching according to an embodiment.

FIG. 5 is an internal configuration diagram of the initial model selection unit 120 illustrated in FIG. 2, FIG. 6 is a diagram illustrating an example in which a key frame is converted through semantic segmentation according to an embodiment, FIG. 7 is a diagram illustrating an example of learning of a video matching network based on self-supervised learning according to an embodiment, and FIG. 8 is a diagram illustrating examples of the results of searching for a video based on environment matching according to an embodiment.

Referring to FIG. 5, the initial model selection unit 120 automatically classifies environments based on major scenes of a video, and finds a model trained in an environment most similar to that of the current scene using the classified environments.

For this, the initial model selection unit 120 first converts key frames extracted from the video that is input in real time into high-dimensional information through semantic segmentation 121.

Though this operation, a problem in which, when images of key frames in the video, extracted by the key frame extraction unit 110, are used without change, the images include a large amount of detailed information such as colors or texture to make it difficult to compare environments with each other, can be solved.

More specifically, in order to determine which types of high-dimensional area characteristics are present in respective areas, rather than intending to exactly segment areas from each key frame through semantic segmentation 121, categories corresponding to a background are removed from 20 segmentation categories, the key frames are modified to output a secondary rank class, and information indicating which area is determined to correspond to each pixel is utilized as higher information.

In FIG. 6, an example in which the key frames such as those illustrated in FIG. 4 are converted into high-dimensional area characteristic input through a semantic segmentation process is illustrated.

The key frames converted into high-dimensional information, as described above, are input to a metric estimator 122 for determining whether the environments of the key frames match environments in which videos corresponding to multiple recognition models stored in the recognition model DB 10 are captured.

The metric estimator 122 may determine similarity between each key frame extracted from a video that is input in real time based on a pretrained similarity-matching network and each of videos used as training data of multiple recognition models stored in the recognition model DB 10, and selects a recognition model pretrained with a video having the maximum similarity to the key frame extracted from the video that is input in real time.

Here, the similarity-matching network learns a video automatic matching network through a self-supervised learning algorithm which does not need the right answer data upon learning the similarity between images in this way.

That is, the similarity-matching network is configured based on a triplet learning target (triplet loss)-based Siamese network.

Here, the term "triplet loss" refers to a loss function that is intended to primarily extract one anchor sample, and secondarily extract a sample, belonging to the same category as the anchor sample, as a positive sample and extract a sample, belonging to a category different from that of the anchor sample, as a negative sample.

When a total of three samples are extracted in this way, the similarity-matching network learns the triplet loss such that the feature distance to the positive sample belonging to the same category as the anchor sample is minimized, and the feature distance to the negative sample belonging to the category different from that of the anchor sample is maximized.

The triplet loss may be represented by the following Equation (1):

$$\text{Loss} = \sum_{i=1}^{N} [\|f_i^a - f_i^p\|_2^2 - \|f_i^a - f_i^n\|_2^2 + \alpha] \quad (1)$$

In Equation (1), $f_i^a$ is a feature acquired from the anchor sample, and $f_i^p$ and $f_i^n$ are features acquired from the positive sample and the negative sample, respectively.

In order to use the triplet loss for network learning, a feature value other than a category must be output as a network result value.

For this, an environment-matching network according to an embodiment may modify the Siamese network, and may then be trained such that a network result is set to the number of features desired by the user.

Such an environment-matching network is trained to recognize key frames, extracted from the same video as the same category and to recognize key frames extracted from different videos as different categories, during a learning process. When such learning is continuously performed, the final environment-matching network outputs a specific feature as one key frame is input. These features are closer to each other for frames in the same video, and become farther away from each other for frames in different videos (i.e., a certain current video and other videos).

The metric estimator 122 may measure similarity between a video captured in a new environment and a previously captured video using the features acquired from input key frames based on the environment-matching network, and may select a video, having a scene similar to that of the video that is input in real time, based on the measured similarity.

For example, as illustrated in FIG. 8, searched videos may be selected as videos similar to a queried video.

Then, as the video having a similar scene is selected, a recognition model trained based on the corresponding video may be selected as an initial model.

Figure 9:
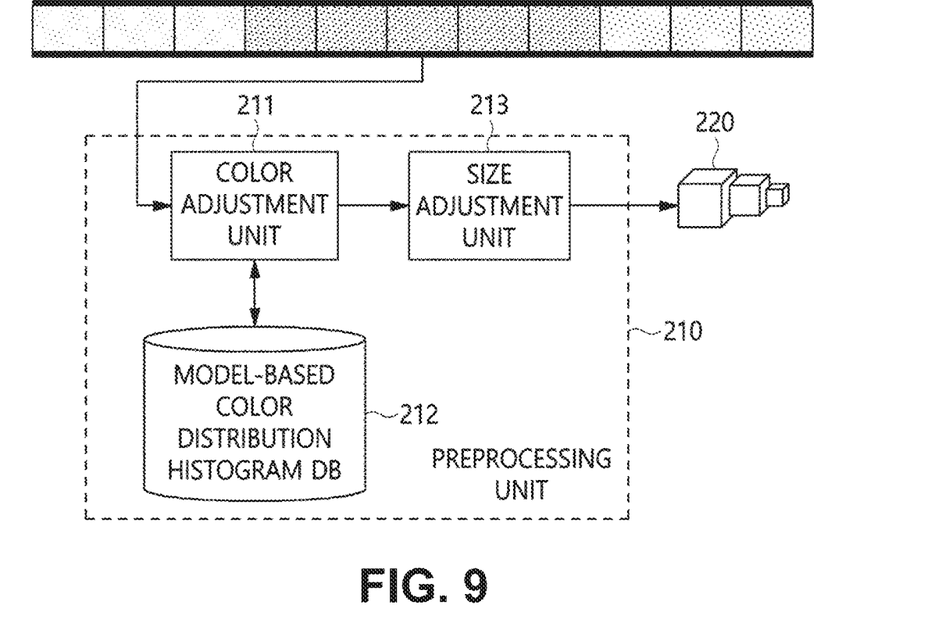
FIG. 9 is an internal configuration diagram of the adaptive recognition unit illustrated in FIG. 1.

FIG. 9 is an internal configuration diagram of the adaptive recognition unit 200 illustrated in FIG. 1.

Referring to FIG. 9, the adaptive recognition unit 200 may include a preprocessing unit 210 and a recognition model 220.

The preprocessing unit 210 may preprocess a video that is input in real time so that used as training data so that at least one of the color and size of a video used as training data of an initial model is similar to that of the input video.

That is, since a color distribution may appear in various forms depending on the type of camera and a capturing environment, performance may be greatly improved compared to the case where an original image is used without change if the color distributions of images are adjusted to be similar to each other. Further, because the size of an object greatly influences the results of the network, objects have various sizes in a Closed-Circuit Television (CCTV) environment in which objects are detected at various heights and magnification ratios, and thus classification performance may be greatly improved if a procedure for adjusting the sizes of objects is added.

Therefore, the preprocessing unit 210 according to an embodiment may include at least one of a color adjustment unit 211 and a size adjustment unit (resize unit) 213.

Here, the color adjustment unit 211 converts the video that is input in real time so that the average color distribution histogram of the input video is similar to the average color distribution histogram of the video used as the training data of the prestored initial model.

The preprocessing unit 210 may further include a model-based color distribution histogram DB 212 for storing average color distribution histograms of learning images for respective recognition models, and the color adjustment unit 211 applies a histogram equalization algorithm so that color distribution histograms obtained from images of the video that is input in real time appear to be similar to the average color distribution histograms stored in the model-based color distribution histogram DB 212.

Meanwhile, the size adjustment unit 213 converts the size of the video that is input in real time into at least two different sizes, individually inputs videos having different sizes to the initial model, determines the size at which the amount of information (i.e., cross-entropy) of an output result value is maximized, and adjusts the size of an image in the video that is input in real time to the determined size.

That is, when an image is input to the initial model, the initial model outputs a probability value for an object recognized in the image as a final result. For example, the result value is output in the form of a vector in which the total sum of probability values is 1, as in the case where a dog is '0.1', a cat is '0.3', and a horse is '0.6'.

However, compared to the case where probability values for recognized objects are similar to each other as in the case of [dog '0.3', cat '0.3', horse '0.4'] and identification of objects included in an actual image becomes ambiguous, a recognition probability for a specific object is completely high as in the case of [dog '0.01', cat '0.01', horse '0.98'], and thus the presence of a peak among recognition probabilities indicates a larger amount of information.

Therefore, the size adjustment unit 213 is configured to, when the size of a video at the time at which entropy is the lowest is selected through entropy (uncertainty) calculation is selected, this selection may mean that the size of the video having the maximum amount of information is selected.

Because the sizes of objects for respective capturing environments appear to be uniform, a procedure for utilizing images having various sizes as input is performed only in an initial stage, and then from the time point selected by the user, the optimal image size is determined based on the calculated image sizes and is utilized as a fixed value.

As described above, the addition of the preprocessing unit 210 which changes color distributions for the current environment and changes the sizes of objects may yield the effect of maximizing the performance of an existing network without requiring additional network learning.

Thereafter, the recognition model 220 may recognize the preprocessed video based on the initial model.

Figure 10:
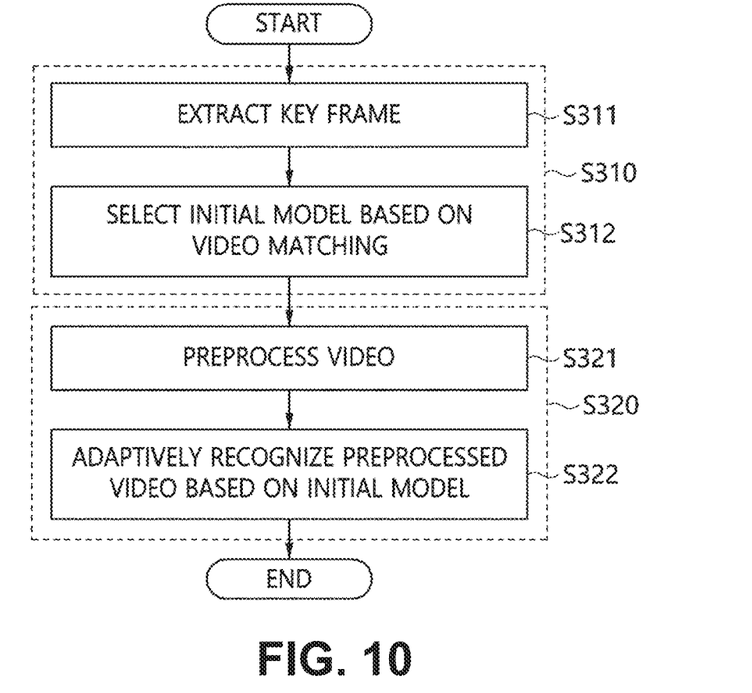
FIG. 10 is a flowchart for explaining an object recognition method based on environment matching according to an embodiment.

FIG. 10 is a flowchart illustrating an object recognition method based on environment matching according to an embodiment.

Referring to FIG. 10, the object recognition method based on environment matching according to the embodiment may perform step S310 of acquiring a recognition model pretrained based on a video captured in an environment similar to an environment to which the scene of a video input in real time belongs, and step S320 of recognizing an object in the scene of the video that is input in real time using the acquired recognition model as an initial model.

Here, at step S310 of acquiring the pretrained recognition model, one recognition model may be selected, based on environment matching, from among multiple recognition models pretrained to recognize objects by using respective videos, captured in different environments, as respective pieces of training data.

Here, step S310 of acquiring the pretrained recognition model may include in detail step S311 of extracting at least one key frame from the video that is input in real time, and step S312 of selecting an initial model from a recognition model DB based on the key frame.

Here, step S311 of extracting the key frame may include the step of extracting features from respective image frames of the video that is input in real time based on a pretrained adversarial autoencoder, and the step of extracting at least one key frame by repeatedly executing a K-means clustering algorithm based on the extracted features. Step S311 of extracting the key frame is identical to the operation of the above-described key frame extraction unit 110, and thus a detailed description thereof will be omitted.

In this case, step S312 of selecting the initial model may include the step of converting the key frame extracted from the video that is input in real time into high-dimensional information through semantic segmentation, the step of determining similarity between the key frame converted into the high-dimensional information and each of videos used as the training data of multiple recognition models stored in a recognition model DB, based on a pretrained similarity-matching network, and the step of selecting a recognition model pretrained with a video having the maximum similarity to the key frame extracted from the video that is input in real time. Step S312 of selecting the initial model is identical the operation of the above-described initial model selection unit 120, and thus a detailed description thereof will be omitted.

Here, recognizing step S320 may include step S321 of preprocessing the video that is input in real time so that at least one of the color and the size of the video used as the training data of the initial model is similar to that of the input video, and step S322 of recognizing the preprocessed video based on the initial model.

Here, preprocessing step S321 may include the step of converting the video that is input in real time so that the average color distribution histogram of the input video is similar to the average color distribution histogram of the video used as the training data of the prestored initial model.

Here, preprocessing step S321 may include the step of changing the size of the video that is input in real time into at least two different sizes, the step of individually inputting videos having different sizes to the initial model, and thereafter determining the size at which the amount of information of an output result value is maximized, and the step of changing the size of the video that is input in real time to the determined size.

Since preprocessing step S321 is identical to the operation of the preprocessing unit 210, a detailed description thereof will be omitted.

Figure 11:
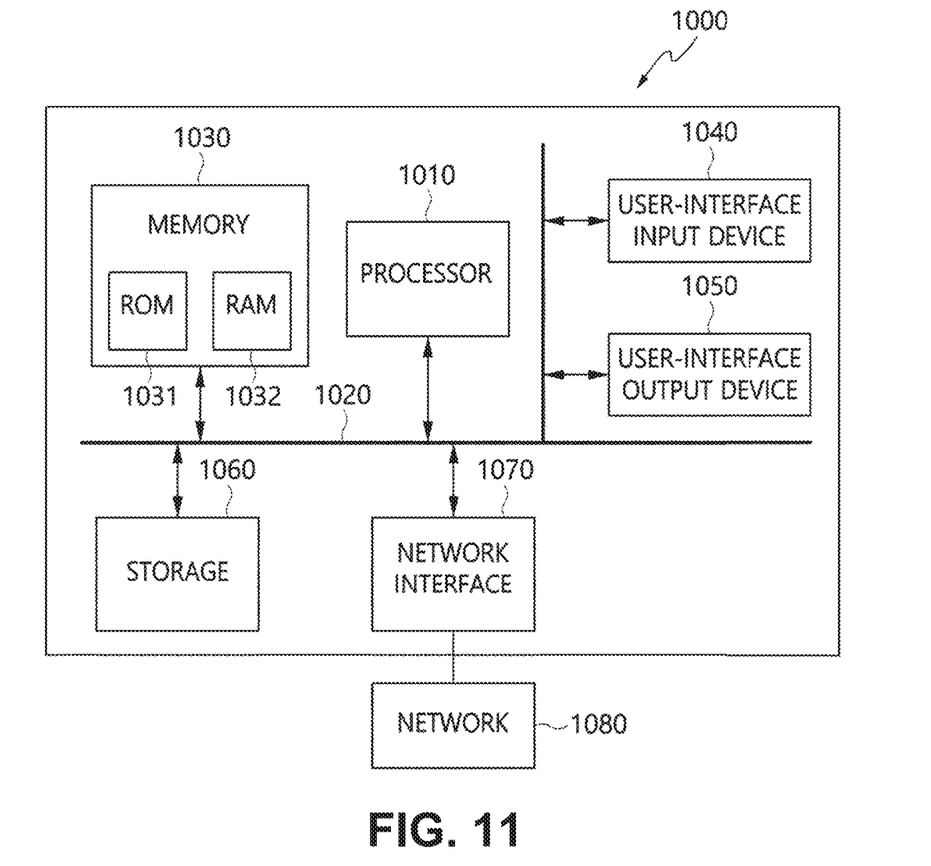
FIG. 11 is a diagram illustrating the configuration of a computer system according to an embodiment.

FIG. 11 is a diagram illustrating the configuration of a computer system according to an embodiment.

An object recognition apparatus based on environment matching may be implemented in a computer system 1000 such as a computer-readable storage medium.

The computer system 1000 may include one or more processors 1010, memory 1030, a user interface input device 1040, a user interface output device 1050, and storage 1060, which communicate with each other through a bus 1020. The computer system 1000 may further include a network interface 1070 connected to a network 1080. Each processor 1010 may be a Central Processing Unit (CPU) or a semiconductor device for executing programs or processing instructions stored in the memory 1030 or the storage 1060. Each of the memory 1030 and the storage 1060 may be a storage medium including at least one of a volatile medium, a nonvolatile medium, a removable medium, a non-removable medium, a communication medium, or an information delivery medium. For example, the memory 1030 may include Read-Only Memory (ROM) 1031 or Random Access Memory (RAM) 1032.

In accordance with the present invention, there can be provided technology which allows a deep-learning network, which recognizes an object from an image, to be automatically optimized and used for the corresponding scene without deteriorating performance even if a current scene is changed from the scene of training data that is previously learned.

In accordance with the present invention, there can be provided technology in which a deep-learning network for recognizing an object from an image does not need to relearn each image input to the deep-learning network each time through labeled data for each environment in which the image is captured.

That is, in accordance with embodiments, a visual feature network adaptive to a scene may be generated by applying technology for converting an input image into an image in a similar environment, instead of applying additional learning so as to apply a scene adaptation technique in on line. Therefore, by a module for grasping whether environments of respective images are similar to each other, the situations in which there are differences depending on the angle of a camera or the structure of a scene can be detected, whereby the present technology may be utilized as technology for automatic extraction of video highlight scenes or similar video matching technology.

Although the embodiments of the present invention have been disclosed with reference to the attached drawing, those skilled in the art will appreciate that the present invention can be implemented in other concrete forms, without changing the technical spirit or essential features of the invention. Therefore, it should be understood that the foregoing embodiments are merely exemplary, rather than restrictive, in all aspects.

What is claimed is:

1. An object recognition apparatus based on environment matching, comprising:
    a memory for storing at least one program; and
    a processor for executing the program,
    wherein the program performs:
        acquiring a video that is input in real time to the object recognition apparatus;
        determining a similarity between a key frame extracted from the video that is input in real time and each of training video data of a plurality of recognition models, based on a pretrained similarity-matching network;
        selecting, among the plurality of recognition models, a recognition model trained with a video having a greatest similarity to the key frame extracted from the video that is input in real time; and
        recognizing an object in a scene of the video that is input in real time using the selected recognition model as an initial model.

2. The object recognition apparatus of claim 1, further comprising:
    the recognition model database for storing the plurality of recognition models, pretrained to recognize an object using respective videos captured in different environments as pieces of training data, in a compressed format,
    wherein the selecting the recognition model comprises:
    selecting one of the plurality of recognition models that are prestored based on environment matching.

3. The object recognition apparatus of claim 1, wherein extracting the at least one key frame comprises:
    extracting features from respective image frames of the video that is input in real time based on a pretrained adversarial autoencoder; and
    extracting the at least one key frame by repeatedly executing a K-means clustering algorithm based on the extracted features.

4. The object recognition apparatus of claim 3, wherein the adversarial autoencoder comprises:
    an autoencoder including an encoder for executing a feature from a first image and a decoder for reconstructing a second image from the feature extracted by the encoder, the autoencoder being pretrained to cause the first image and the second image to be similar to each other; and
    a discriminator pretrained to discriminate the first image from the second image,
    wherein extracting the features comprises outputting the feature extracted by the encoder for the video that is input in real time.

5. The object recognition apparatus of claim 1, wherein:
    selecting the recognition model further comprises converting the key frame extracted from the video that is input in real time into high-dimensional information through semantic segmentation, and
    the key frame converted into the high-dimensional information is input to the pretrained similarity-matching network.

6. The object recognition apparatus of claim 5, wherein the similarity-matching network is configured based on a Siamese network based on a triplet loss, and is trained such that a feature distance to a positive sample belonging to a category identical to a category of an anchor sample is minimized and a feature distance to a negative sample belonging to a category different from the category of the anchor sample is maximized.

7. The object recognition apparatus of claim 1, wherein recognizing the object comprises:
    preprocessing the video that is input in real time such that at least one of a color and a size of a video used as training data of the selected recognition model is similar to at least one of a color and a size of the input video; and
    recognizing the preprocessed video based on the selected recognition model.

8. The object recognition apparatus of claim 7, wherein preprocessing the video comprises:
    converting the video that is input in real time such that an average color distribution histogram of the input video is similar to an average color distribution histogram of the video used as the training data of the selected recognition model that is prestored.

9. An object recognition apparatus based on environment matching, comprising:
    a memory for storing at least one program; and
    a processor for executing the program,
    wherein the program performs:
        acquiring a recognition model pretrained based on a video captured in an environment similar to an environment to which a video that is input in real time belongs; and recognizing an object in a scene of the video that is input in real time using the acquired recognition model as an initial model, by performing preprocessing on the video that is input in real time and inputting the preprocessed video into the initial model, wherein the preprocessing comprises:

converting the size of the video that is input in real time to at least two different sizes;

after videos having different sizes are individually input to the initial model, determining a size of a video having a minimum entropy in an output result value; and changing the size of the video that is input in real time to the determined size.

10. An object recognition method based on environment matching, comprising:

acquiring a video that is input in real time;
determining a similarity between a key frame extracted from the video that is input in real time and each of training video data of a plurality of recognition models, based on a pretrained similarity-matching network;

selecting, among the plurality of recognition models, a recognition model trained with a video having a greatest similarity to the key frame extracted from the video that is input in real time; and recognizing an object in a scene of the video that is input in real time using the selected recognition model as an initial model.

11. The object recognition method of claim 10, wherein acquiring the pretrained recognition model further comprises:

selecting one of the plurality of recognition models predefined to recognize an object using each of videos captured in different environments as training data, based on environment matching.

12. The object recognition method of claim 10, wherein extracting the at least key frame comprises:

extracting features from respective image frames of the video that is input in real time based on a pretrained adversarial autoencoder; and extracting the at least one key frame by repeatedly executing a K-means clustering algorithm based on the extracted features.

13. The object recognition method of claim 10, wherein selecting the recognition model further comprises:

converting the key frame extracted from the video that is input in real time into high-dimensional information through semantic segmentation;

determining the similarity between the key frame, converted into high-dimensional information, and each of the training video data of the plurality of recognition models, based on the pretrained similarity-matching network.

14. The object recognition method of claim 10, wherein recognizing the object comprises:

preprocessing the video that is input in real time such that at least one of a color and a size of a video used as training data of the selected recognition model is similar to at least one of a color and a size of the input video; and recognizing the preprocessed video based on the selected recognition model.

15. The object recognition method of claim 14, wherein preprocessing the video comprises:

converting the video that is input in real time such that an average color distribution histogram of the input video is similar to an average color distribution histogram of the video used as the training data of the selected recognition model that is prestored.

16. An object recognition method based on environment matching, comprising:

acquiring a recognition model pretrained based on a video captured in an environment similar to an environment to which a video that is input in real time belongs; and recognizing an object in a scene of the video that is input in real time using the acquired recognition model as an initial model, by performing preprocessing on the video that is input in real time and inputting the preprocessed video into the initial model, wherein the preprocessing comprises:

converting the size of the video that is input in real time to at least two different sizes;

after videos having different sizes are individually input to the initial model, determining a size of a video having a minimum entropy in an output result value; and changing the size of the video that is input in real time to the determined size.

17. An object recognition apparatus based on environment matching, comprising: a memory for storing at least one program; and a processor for executing the program,
wherein the program performs:
extracting at least one key frame from a video that is input in real time;

determining a similarity between the key frame extracted from the video that is input in real time and each of videos used as training data of prestored multiple recognition models, based on a pretrained similarity-matching network;

selecting a recognition model pretrained with a video having a maximal similarity to the key frame extracted from the video that is input in real time;

preprocessing the video that is input in real time such that at least one of a color and a size of a video used as training data of an initial model is similar to at least one of a color and a size of the input video; and recognizing the preprocessed video based on the initial model.

* * * * *